United States Patent
Everson et al.

(10) Patent No.: US 7,508,928 B1
(45) Date of Patent: Mar. 24, 2009

(54) SYSTEM AND METHOD FOR VOICE-OVER-PACKET CALLING WITH PSTN BACKUP

(75) Inventors: John M. Everson, Kansas City, MO (US); Bryce A. Jones, Overland Park, KS (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 881 days.

(21) Appl. No.: 10/835,819

(22) Filed: Apr. 30, 2004

(51) Int. Cl.
*H04M 7/00* (2006.01)

(52) U.S. Cl. ............ 379/221.01; 379/33; 379/37; 370/352

(58) Field of Classification Search ............ 379/33, 379/37, 93.01, 106.01, 221.01, 221.03, 221.14, 379/207.14; 370/351, 352, 353, 354, 355, 370/356
See application file for complete search history.

(56) References Cited

U.S. PATENT DOCUMENTS

| | | | |
|---|---|---|---|
| 5,604,737 | A | 2/1997 | Iwami et al. |
| 5,712,907 | A | 1/1998 | Wegner et al. |
| 5,742,596 | A | 4/1998 | Baratz et al. |
| 5,889,774 | A | 3/1999 | Mirashrafi et al. |
| 6,118,864 | A | 9/2000 | Chang et al. |
| 6,253,249 | B1 | 6/2001 | Belzile |
| 6,339,593 | B1 | 1/2002 | Kikinis |
| 6,389,005 | B1 | 5/2002 | Cruickshank |
| 6,426,942 | B1 | 7/2002 | Sienel et al. |
| 6,456,615 | B1 | 9/2002 | Kikinis |
| 6,665,293 | B2 * | 12/2003 | Thornton et al. ............ 370/352 |
| 6,958,992 | B2 * | 10/2005 | Lee et al. .................... 370/352 |
| 7,042,985 | B1 * | 5/2006 | Wright ........................ 379/45 |
| 2002/0106017 | A1 * | 8/2002 | Dombkowski et al. ...... 375/238 |
| 2002/0114430 | A1 | 8/2002 | Murata |
| 2002/0154626 | A1 * | 10/2002 | Ryu .......................... 370/352 |
| 2003/0026247 | A1 | 2/2003 | Berstein |
| 2003/0053446 | A1 | 3/2003 | Kwon |
| 2004/0057425 | A1 * | 3/2004 | Brouwer et al. ............ 370/352 |
| 2005/0047574 | A1 * | 3/2005 | Reid .................... 379/211.01 |
| 2005/0073995 | A1 * | 4/2005 | Yeh et al. .................... 370/352 |
| 2005/0213565 | A1 * | 9/2005 | Barclay et al. .............. 370/352 |
| 2006/0029196 | A1 * | 2/2006 | Reynolds et al. ......... 379/88.19 |
| 2008/0260139 | A1 * | 10/2008 | Ruckart et al. ......... 379/221.01 |

OTHER PUBLICATIONS

Cable Datacom News, "Cable IP Telephony Primer," Jan. 15, 2003.
"Cisco ATA 186 Analog Telephone Adaptor," Data Sheet, Cisco Systems Inc., 2002.

* cited by examiner

*Primary Examiner*—Olisa Anwah

(57) ABSTRACT

A telephony interface system has a controller and multiple communication interfaces to provide voice-over-packet (VoP) telephone service with PSTN telephone service as backup. The telephony interface system has a communication interface for at least one telephony device, a communication interface for the PSTN, and a communication interface for a packet-switched network. To originate a call, the telephony interface system connects the telephony device to the PSTN if the dialed digits for the call correspond to a predetermined telephone number or numbers, such as 911. Otherwise, the telephony interface system connects the telephony device to the packet-switched network.

10 Claims, 2 Drawing Sheets

SYSTEM AND METHOD FOR VOICE-OVER-PACKET CALLING WITH PSTN BACKUP

BACKGROUND

1. Field of Invention

The present invention relates to telecommunication networks, and more particularly, to methods and systems for selectively using either a packet-switched network or a circuit-switched network to make a telephone call.

2. Description of Related Art

To reduce the cost of telephone calls and to simplify management of communicational devices, it is often desirable for homes and offices to use telephones that connect to the Internet to originate calls. In particular, a telephone may connect to another telephone via the Internet by using voice-over-packet (VoP) technology. In one approach for providing voice-over-packet based telephone service, an analog telephone is connected to a media terminal adaptor (MTA), such as the Cisco ATA-186 analog telephone adaptor. The MTA is connected to the Internet via a high-speed connection, such as a cable modem or a DSL modem. A media gateway may connect the Internet to the public switched telephone network (PSTN).

One disadvantage with VoP technology is that certain calls originating from the MTA may be blocked. For example, calls to emergency service providers, e.g., calls to 911, are often blocked. Even if 911 calls are not blocked, caller location information may be unavailable to emergency service providers because the caller's telephone number may be associated with the gateway, rather than with a particular premise or other physical location.

SUMMARY

In a first principal aspect, an exemplary embodiment of the present invention provides a telephony interface system. The telephony interface system comprises a first interface that is communicatively coupled to a telephony device, a second interface that is communicatively coupled to a packet-switched network such that calls originating from that second interface are associated with a first caller identifier, a third interface that is communicatively coupled to a circuit-switched network such that calls originating from the third interface are associated with a second caller identifier, and a controller. The telephony device generates dialed digits to place a call, and the controller selectively couples the first interface with either the second or the third interface based, at least in part, on the dialed digits from the telephony device.

In a second principal aspect, an exemplary embodiment of the present invention provides a method of selecting a network to originate a call. In accordance with the method, dialed digits are received from a telephony device. The dialed digits are compared to at least one predetermined directory number. If the dialed digits correspond to the at least one predetermined directory number, the call is originated via a circuit-switched network such that the call is associated with a first caller identifier. If the dialed digits do not correspond to the at least one predetermined directory number, the call is originated via a packet-switched network such that the call is associated with a second caller identifier.

DETAILED DESCRIPTION OF EXEMPLARY EMBODIMENTS

1. Overview

Figure 1:
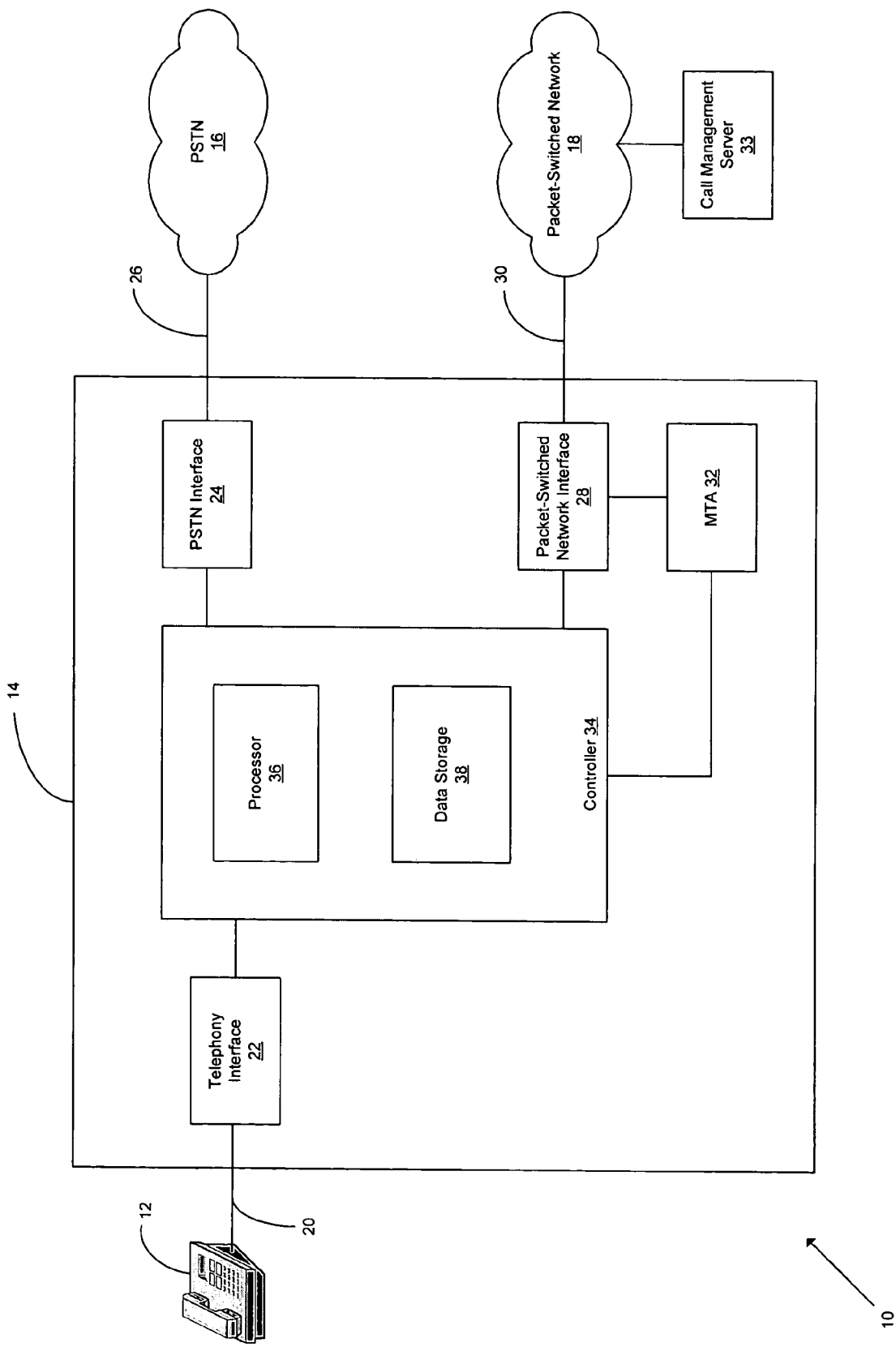
FIG. 1 is a simplified block diagram of a telephony interface system, in accordance with an exemplary embodiment of the present invention.

To address the problem that VoP-based telephone services often block calls to certain telephone numbers, such as calls to 911, the present invention provides a telephony interface system that can connect a telephony device, such as an analog telephone, to either a VoP network or to a circuit-switched network (e.g., the PSTN), depending on what number is called. In particular, the telephony interface system may connect the telephony device to the VoP network for most calls but may connect the telephony device to the PSTN as a backup for certain types of calls. For example, the telephony interface system may use the PSTN only for calls that are blocked by the VoP service, e.g., calls to 911. Advantageously, many jurisdictions allow 911 calls to be placed over landline connections even from callers who have not subscribed to telephone service over the connection. Although 911 calls are one type of calls for which the telephony interface system may use the PSTN, the telephony interface system may also use the PSTN for other types of calls, such as calls to in-home security services.

When the VoP network is used to place the call, the caller may be identified by a first caller identifier, e.g., a directory number associated with a VoP network element. However, when the PSTN is used to place the call, the caller may be identified by a second, different caller identifier, e.g., a directory number associated with a particular telephone line to a local switch. Because the second caller identifier is associated with a fixed location, such as the caller's premises, it may be used to determine the caller's location during a 911 call.

In an exemplary embodiment, the telephony interface system may function as a media terminal adaptor (MTA) for VoP service, but with an additional connection to the PSTN. Thus, the telephony interface may include an RJ-11 connector for connecting to an analog telephone, an RJ-11 connector for connecting to a telephone line that goes to a local switch of the PSTN, and an RJ-45 connector for connecting to a local area network (LAN). The LAN may include a high speed Internet connection, such as a cable modem or a DSL modem. The LAN may include a router that interconnects the telephony device with the cable or DSL modem. Other devices, such as a computer or a wireless access point, may also be connected to the LAN.

In an exemplary embodiment, the telephony interface system includes a controller that controls whether calls from the telephony device are routed to the VoP network or to the PSTN, based, at least in part, on what number is called. For example, the controller may receive the dialed digits from the telephony device and compare them to a set of one or more predetermined directory numbers for which the PSTN backup is to be used. The set of predetermined directory numbers may include 911 and/or other directory numbers. If the dialed digits correspond to one of the predetermined telephone numbers, then the controller connects the telephony device directly to the PSTN. The PSTN then routes the call to its destination. In the PSTN-direct call, the caller is identified by the second caller identifier.

If, however, the dialed digits do not correspond to one of the predetermined telephone numbers, then the telephony interface system connects the telephony device to the VoP network. A user agent, which may be in the telephony interface system, then routes the call through the VoP network, e.g., to a gateway to the PSTN, using a protocol such as the Session Initiation Protocol (SIP) or H.323. In the VoP signaling, the caller is identified by the first caller identifier.

2. Exemplary Architecture

FIG. 1 is a simplified block diagram of a telecommunication system 10 that includes a telephony device 12, a telephony interface system 14, a circuit-switched network 16 (e.g., the PSTN), and a packet-switched network 18.

Telephony device 12 may be an analog telephone, a digital telephone, a fax machine, or any other device that is capable of making telephone calls. Telephony device 12 is connected to telephony interface system 14 through a telephony connection 20, which may include, for example, a conventional four-wire telephone line and an RJ-11 plug. More particularly, telephony interface system 14 includes a telephony interface 22 to which telephone line 20 is connected. Telephony interface 22 processes signals to and from telephony device 12. In some embodiments, telephony interface 22 may be able to connect to multiple telephony devices at the same time. Alternatively, telephony interface system may include multiple telephony interfaces for connecting to multiple telephony devices.

Telephony interface system 14 also includes a PSTN interface 24 for connection to PSTN 16, via a PSTN connection 26. PSTN connection 26 may include, for example, a telephone line connected to a local service provider switch and may make use of conventional RJ-11 connectors. Thus, in an exemplary embodiment, telephony interface system 14 may be located at a customer's premises where telephony device 12 could be connected to PSTN 16 in a conventional manner, e.g., by connecting telephony device 12 to a wall-mounted RJ-11 jack. To use telephony interface system 14, however, telephony device 12 may instead be connected to telephony interface system 14, and telephony interface system 14 connected to PSTN 16, for example, using the wall-mounted RJ-11 jack where telephony device 12 would conventionally be connected. In this way, telephony device 12 may be able to originate (and, optionally, also receive) at least certain PSTN calls in a manner similar to when telephony device 12 is connected to PSTN 16 directly.

Telephony interface system 14 also includes a packet-switched network interface 28 for connection to packet-switched network 18, via a packet-switched connection 30. Packet-switched connection 30 may include, for example, a local area network (LAN) and a network access device, such as a DSL model or cable modem.

Telephony interface system 14 may also include a media terminal adapter (MTA) 32 that handles voice compression, packetization, security, and call signaling for VoP communication via packet-switched network 18. Thus, MTA 32 may generate dial tone for telephony device 12 and may convert voice signals from telephony device 12 (or modulated signals generated by fax machines) into a digital format. MTA 32 may also compress the digital data for transport. MTA 32 may also packetize data into packets that the packet-switched network 18 is able to route. MTA 32 may additionally encrypt the telephone data for better security.

MTA 32 may also engage in signaling to route calls through packet-switched network 18. For example, if SIP is used for the VoP signaling, then MTA 32 may include a SIP user agent. Alternatively, telephony interface system 14 may rely on another device for MTA functionality. For example, a cable modem used in packet-switched connection 30 may include an embedded MTA.

A call management server 33 may control communication sessions through packet-switched network 18. In particular, telephony interface system 14 may communicate with call management server 33 to send and receive calls via packet-switched network 18. For example, in the case that SIP is used to set up communication sessions, call management server 33 may include a SIP registrar and may be accessible via one or more SIP proxy servers. In some cases, call management server 33 may route a call to a gateway to PSTN 16, and PSTN 16 may, in turn, route the call to its ultimate destination.

To originate a call from telephony device 12, telephony interface system 14 selectively connects telephony device 12, via telephony interface 22, to PSTN 16, via PSTN interface 24, or to packet-switched network 18, via packet-switched network interface 28. More particularly, telephony interface system 14 may include a controller 34 that determines, based at least in part on the dialed digits from telephony device 12, whether to use PSTN 16 or packet-switched network 18 for the call. When PSTN 16 is used for the call, controller 34 may connect telephony interface 22 to PSTN interface 24, such that the caller is identified by a PSTN caller identifier. The PSTN caller identifier could be, for example, a directory number associated with PSTN connection 26. However, instead of or in addition to a directory number, the PSTN caller identifier could identify the caller in other ways. For example, the caller identifier could identify the caller by name and/or address. In particular, if a customer uses the PSTN only as a backup, e.g., for 911 calls, then it may be advantageous for a local service provider to use a caller identifier that does not require the local service provider to assign one of its limited number of directory numbers to the customer.

When packet-switched network 18 is used for the call, controller 34 may connect telephony interface 22 to packet-switched network interface 28, such that the caller is identified by a VoP caller identifier. The VoP caller identifier could be, for example, a directory number associated with MTA 32 or call management server 33. However, instead of or in addition to a directory number, the VoP caller identifier could identify the caller in other ways.

Controller 34 could be implemented in a number of different ways, which may involve hardware, software, and/or firmware. For example, as shown in FIG. 1, controller 34 may include a processor 36 and data storage 38. Data storage 38 may include volatile memory, such as RAM, and/or nonvolatile memory, such as ROM. Data storage 38 may store the one or more predetermined numbers to which dialed digits from telephony device 12 are compared. In some cases, the predetermined number(s) stored in data storage 38 could be changed by the user. In other cases, the predetermined number(s) may be pre-set and not easily changed. Data storage 38 may also store machine language instructions that are executed by processor 36 to control the functioning of telephony interface system 14. Alternatively, controller 34 could be implemented with programmable logic devices.

In one example, the controller 34 may compare the dialed digits with only a single predetermined number, such as "911." Then, if the dialed digits correspond to "911" or other predetermined number, controller 34 directs the call to PSTN interface 24. Otherwise, the controller 34 directs the call to packet-switched interface 28.

In another example, the controller 34 may compare the dialed digits with more than one predetermined number. Thus, the set of predetermined numbers may include 911, as well as numbers for other calls for which a telephone line to a local switch may be beneficial. For example, the set of predetermined numbers could include 911, the telephone number for an in-home security provider, and/or various emergency numbers. In an exemplary embodiment, the predetermined numbers could be changed as desired by the user, as described above.

3. Exemplary Operation

Figure 2:
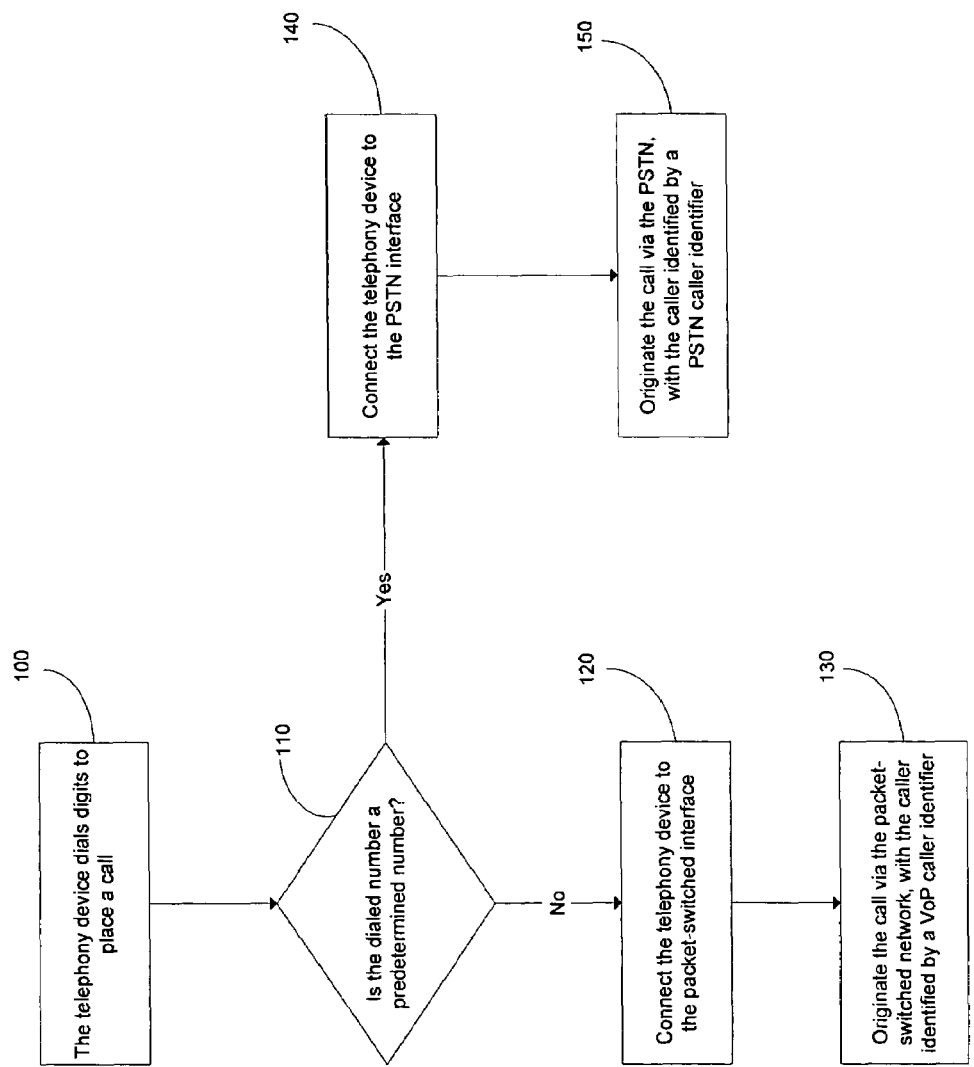
FIG. 2 is a flow chart illustrating an exemplary method of originating calls using the telephony interface system of FIG. 1, in accordance with an exemplary embodiment of the present invention.

FIG. 2 is a flow chart illustrating an exemplary method of providing a PSTN backup for emergency calls in a VoP system, e.g., using telecommunication system 10 shown in FIG. 1. The process may begin when telephony device 12 is used to place a telephone call, as indicated in block 100. At this point, telephony interface system 14 may detect an open voltage on telephone interface 22, indicating that a user has picked up the handset. The user dials digits to place the call, and controller 34 may detect the dialed digits transmitted by telephony device 12.

Once the user has dialed the digits to place the call, controller 34 compares the dialed digits with one or more predetermined telephone numbers, as indicated in block 110. If controller 34 determines that the dialed digits do not correspond to one of the predetermined telephone numbers, then controller 34 connects telephony interface 22 to packet-switched interface 28, as indicated in block 120. The call is then originated via packet-switched network 18, with the caller being identified by a VoP caller identifier, e.g., a first directory number, as indicated in block 130. Packet-switched network 18 may, in turn, route the call to a PSTN gateway, with the PSTN routing the call to its ultimate destination.

If, however, controller 34 determines that the dialed digits correspond to one of the predetermined telephone numbers, then controller 34 connects telephony interface 22 to PSTN interface 24, as indicated in block 140. The call is then originated via PSTN 16, with the caller being identified by a PSTN caller identifier, e.g., a second directory that is different than the first directory number, as indicated in block 150. Because the PSTN caller identifier is associated with a physical location, e.g., a residential address, an emergency services provider or other called party can determine where the call originated.

4. Conclusion

Exemplary embodiments of the present invention have been described above. Those skilled in the art will understand, however, that changes and modifications may be made to these embodiments without departing from the true scope and spirit of the invention, which is identified by the claims.

What is claimed is:

1. A telephony interface system, comprising:
    a first interface, communicatively coupled to a telephony device, said telephony device generating dialed digits to place a call;
    a second interface, communicatively coupled to a packet-switched network such that calls originating from said second interface are associated with a first caller directory number;
    a third interface, communicatively coupled to a circuit-switched network such that calls originating from said third interface are associated with a second caller directory number, said second caller directory number being different than said first caller directory number; and
    a controller, said controller selectively coupling said first interface with one of said second and third interfaces, based, at least in part, on said dialed digits from said telephony device.

2. The telephony interface system of claim 1, wherein said controller couples said first interface with said third interface if said dialed digits correspond to at least one predetermined directory number.

3. The telephony interface system of claim 2, wherein said controller couples said first interface with said second interface unless said dialed digits correspond to said at least one predetermined directory number.

4. The telephony interface system of claim 2, wherein said at least one predetermined directory number includes an emergency services number.

5. The telephony interface system of claim 4, wherein said emergency services number is 911.

6. The telephony interface system of claim 2, wherein said at least one predetermined directory number includes an in-home security service number.

7. A method of selecting a network to originate a call, said method comprising:
    receiving dialed digits from a telephony device to originate a call;
    comparing said dialed digits to at least one predetermined directory number;
    if said dialed digits correspond to said at least one predetermined directory number, originating said call via a circuit-switched network such that said call is associated with a first caller directory number; and
    if said dialed digits do not correspond to said at least one predetermined directory number, originating said call via a packet-switched network such that said call is associated with a second caller directory number, said second caller directory number being different than said first caller directory number.

8. The method of claim 7, wherein said at least one predetermined directory number includes an emergency services number.

9. The method of claim 8, wherein said emergency services number is 911.

10. The method of claim 7, wherein said at least one predetermined directory number includes an in-home security service number.

* * * * *